US006796692B2

(12) United States Patent
Nakada et al.

(10) Patent No.: US 6,796,692 B2
(45) Date of Patent: Sep. 28, 2004

(54) VEHICLE HEADLAMP WITH SOLENOID-ACTUATED MOVABLE SHADE

(75) Inventors: Katsumi Nakada, Shizuoka (JP); Shoichiro Yokoi, Shizuoka (JP); Shigeyuki Watanabe, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/167,543

(22) Filed: Jun. 12, 2002

(65) Prior Publication Data

US 2002/0191411 A1 Dec. 19, 2002

(30) Foreign Application Priority Data

Jun. 15, 2001 (JP) .................................... P2001-181060
Feb. 28, 2002 (JP) .................................... P2002-053367

(51) Int. Cl.[7] ................................................ B60Q 1/04
(52) U.S. Cl. ........................ 362/512; 362/319; 362/531
(58) Field of Search ........................... 362/3, 4, 16, 18, 362/459, 464, 465, 467, 468, 487, 506, 507, 509, 512, 513, 523, 526, 531, 257, 276, 277, 317, 319, 321, 322, 324, 538, 539, 282, 284, 382, 386; 335/262, 263, 209, 220, 255, 261

(56) References Cited

U.S. PATENT DOCUMENTS 1,660,699 A * 2/1928 Wood ......................... 362/282
3,504,168 A * 3/1970 Johnson et al. ............. 362/507
3,626,174 A * 12/1971 Cranmore ................... 362/507
3,879,694 A * 4/1975 Cousino et al. ............. 335/261
3,903,984 A * 9/1975 Andres et al. .............. 362/507
4,041,430 A * 8/1977 Hrynewycz ................. 335/278
4,217,567 A * 8/1980 Roy et al. ................... 335/262
4,443,836 A * 4/1984 Horiuchi et al. ............ 362/375
4,857,794 A * 8/1989 Watanabe ................... 362/539
5,213,406 A * 5/1993 Neumann et al. ........... 362/512
6,179,455 B1 * 1/2001 Taniuchi ..................... 362/512
6,286,985 B1 * 9/2001 Ohshio et al. .............. 362/512
6,354,721 B1 * 3/2002 Zattoni ....................... 362/539
6,428,195 B1 * 8/2002 Ohshio et al. .............. 362/512
6,443,606 B1 * 9/2002 Mochizuki .................. 362/539
6,474,854 B2 * 11/2002 Ohshio ....................... 362/539
6,488,396 B1 * 12/2002 Hayakawa et al. ......... 362/539
6,491,419 B1 * 12/2002 Ohshio ....................... 362/539
6,565,245 B2 * 5/2003 Yokoi ......................... 362/539

* cited by examiner

*Primary Examiner*—Thomas M. Sember
*Assistant Examiner*—Ismael Negron
(74) *Attorney, Agent, or Firm*—Fish & Richardson PC

(57) ABSTRACT

A vehicle headlamp structure for engagement between a plunger of a solenoid and a shade leg of a movable shade, wherein the solenoid moves the movable shade to vary the light distribution of a lamp fixture. A moveable shade 22 is pivoted between two positions by a solenoid 34 having a longitudinally extending plunger 36. The plunger 36 has a notch (U-shaped recess) 36*a* formed in its peripheral surface at a position near the tip thereof. A shade leg 22B of the movable shade 22 has an engaging portion 22Ba for engaging with the notch 36*a*. Since the engaging portion 22Ba abuts on a front end face 36*a*1 and a rear end face 36*a*2 of the notch 36*a*, reciprocating movement if the plunger 36 is converted into pivoting movement of the movable shade 22.

14 Claims, 13 Drawing Sheets

VEHICLE HEADLAMP WITH SOLENOID-ACTUATED MOVABLE SHADE

BACKGROUND OF THE INVENTION

The present invention relates to a vehicle headlamp capable of varying light distribution of a lamp fixture by moving a movable shade.

A vehicle headlamp reflects light from a light source forward by a reflector to emit a beam as a low beam or high beam. Since a required light distribution pattern is different between the low beam and the high beam, switching between low beam and high beam is commonly conducted by switching the ON/OFF state of two light sources included in a light source bulb or the ON/OFF state of two light source bulbs.

A vehicle headlamp for conducting beam switching by using a single light source is also known in the art. In particular, a two-lamp-type headlamp using a discharge bulb as a light source bulb often has such a structure.

A method for conducting beam switching by moving a movable shade, as disclosed for example in Japanese Patent Application No. 2000-207918, is conventionally known as one of the beam switching methods using a single light source.

In the beam switching method described above, a solenoid is used to move the movable shade between two prescribed positions having different light-shielding amounts for the light incident on a reflector from the light source.

In this case, a plunger of the solenoid is connected to a leg of the movable shade in order to transmit the driving force of the solenoid to the movable shade. One example of such a connection structure is the engagement structure as shown in FIG. 13, which is an improvement of the connection structure described above.

More specifically, in this engagement structure, a slit (slot) 2*a* extending in the axial direction of a longitudinally extending plunger 2 is formed in the front end face of the plunger 2, and a through hole 2*b* extending perpendicularly to the slit 2*a* is formed in the plunger 2 at a position near the tip thereof. A spring pin 4 is press-fitted in the through hole 2*b*. A long groove 6*a* is formed at the tip of a shade leg 6. The tip of the shade leg 6 is inserted into the slit 2*a* of the plunger 2 so that the spring pin 4 is engaged with the long groove 6*a*.

This engagement structure uses the spring pin 4 to engage the plunger 2 with the shade leg 6. This requires the costs for the spring pin, costs for mounting the same, and processing costs for forming the slit 2*a* and the through hole 2*b* in the plunger 2, thereby increasing the overall cost for the lamp fixture.

Such a problem generally occurs not only when switching between low beam and high beam is conducted by moving the movable shade, but also when light distribution of the lamp fixture is varied by moving the movable shade.

SUMMARY OF THE INVENTION

The present invention is made in view of the above problems. The present invention provides a vehicle headlamp that varies light distribution of a lamp fixture by moving a movable shade, and enables reduction in costs for the structure for engagement between a plunger and a shade leg.

The present invention improves the structure for engagement between the plunger and the shade leg.

More specifically, a vehicle headlamp according to the present invention includes a light source, a reflector for reflecting light forward from the light source, a movable shade capable of shielding part of light incident on the reflector from the light source or part of light reflected from the reflector, and a shade driver for moving the movable shade between two prescribed positions having different light-shielding amounts for the incident light or the reflected light. The movable shade includes a shade body and a shade leg extending from the shade body, the shade driver including a solenoid having a plunger extending in a longitudinal direction, the plunger having a prescribed notch formed in its peripheral surface at a position near a tip thereof, and the shade leg having an engaging portion for engaging with the notch. As the engaging portion abuts on a front end face and a rear end face of the notch, reciprocating movement of the plunger is converted into movement of the movable shade.

The type of the "light source" is not limited. For example, a discharge light-emitting portion of a discharge bulb or a filament of an incandescent bulb such as halogen bulb may be used.

The specific structure of the "movable shade" is not limited as long as it is capable of shielding part of light incident on the reflector from the light source bulb or part of light reflected from the reflector. The shade body may be integral with the shade leg, or the shade body and the shade leg may be separate elements.

The "two prescribed positions having different light-shielding amounts for the incident light or the reflected light" may be such positions that the movable shade forms a low-beam light distribution pattern or a high-beam light distribution pattern, or may be such positions that the movable shade forms another light distribution pattern.

The specific structure of the "shade driver" is not limited as long as it includes a solenoid having a longitudinally extending plunger and moves the movable shade between the above two positions. Moreover, the manner in which the movable shade is "moved" by the shade driver is not limited. For example, pivoting or linear reciprocation may be employed.

The specific structure of the "notch," such as its shape and position, is not limited. The notch may be formed either as a recess or a through hole.

The specific structure of the "engaging portion" such as its shape and position is not limited as long as it engages with the notch such that it can abut on the front end face and the rear end face of the notch. The "engaging portion" need not simultaneously abut on both the front and rear end faces of the notch, but need only abut on one of the front and rear end faces.

As described above, in the vehicle headlamp of the present invention, a movable shade including a shade body and a shade leg is moved between prescribed positions by using a solenoid having a longitudinally extending plunger. The plunger has a prescribed notch formed in its peripheral surface at a position near the tip thereof, and the shade leg has an engaging portion for engaging with the notch. As the engaging portion abuts on a front end face and a rear end face of the notch, reciprocating movement of the plunger is converted into movement of the movable shade. As a result, unlike conventional headlamp structures, engagement between the plunger and the shade leg can be obtained without using a spring pin.

This eliminates the costs for the spring pin and costs for mounting the same. Moreover, the notch need only be formed in the plunger instead of forming a slit and a through hole as in the conventional example. This enables reduction in processing costs.

The present invention thus enables reduction in costs for the structure for engagement between the plunger and the shade leg in a vehicle headlamp that varies light distribution of a lamp fixture by moving the movable shade.

In the above structure, the movement of the movable shade may be realized as pivoting movement in the longitudinal direction. In this case, forming a front end face and a rear end face of the engaging portion with an approximately circular-arc shape enables reciprocating movement of the plunger to be smoothly converted into movement of the movable shade.

The shape of the "notch" is not limited, as described above. The notch may be a U-shaped recess having a U-shape in cross section including an axis of the plunger. This enables the engaging portion to reliably abut on the front end face and the rear end face of the notch. In this case, the engaging portion can be inserted into the notch either along the U-shaped recess or laterally into the U-shaped recess. This enables the lamp fixture to be mounted with improved flexibility.

The "notch" may alternatively be an annular recess formed in a whole peripheral surface of the plunger and having a U-shaped cross section. This enables the engaging portion to reliably abut on the front end face and the rear end face of the notch regardless of the angular position of the plunger with respect to its axis. As a result, mounting operation can be conducted with improved efficiency. Moreover, the engaging portion can be inserted into the notch from any direction, whereby the lamp fixture can be mounted with further improved flexibility. Furthermore, forming the notch as such an annular recess enables the notch to be easily formed by a turning process, thereby achieving further reduction in processing costs for the plunger.

Alternatively, the "notch" may be a rectangular slot extending through the plunger and having a rectangular cross section. This enables the engagement between the plunger and the shade leg to be reliably maintained even when the plunger and the movable leg become excessively loose, or the like.

In an alternate structure, the shade leg may have a pair of engaging portions formed with a prescribed gap therebetween. The pair of engaging portions may engage with the notch by holding therebetween the plunger at a position near the tip thereof. This configuration enables the engagement between the plunger and the shade leg to be reliably maintained regardless of the shape of the notch.

Hereinafter, embodiments of the present invention will be described in conjunction with the accompanying drawings.

DETAILED DESCRIPTION

Figure 1:
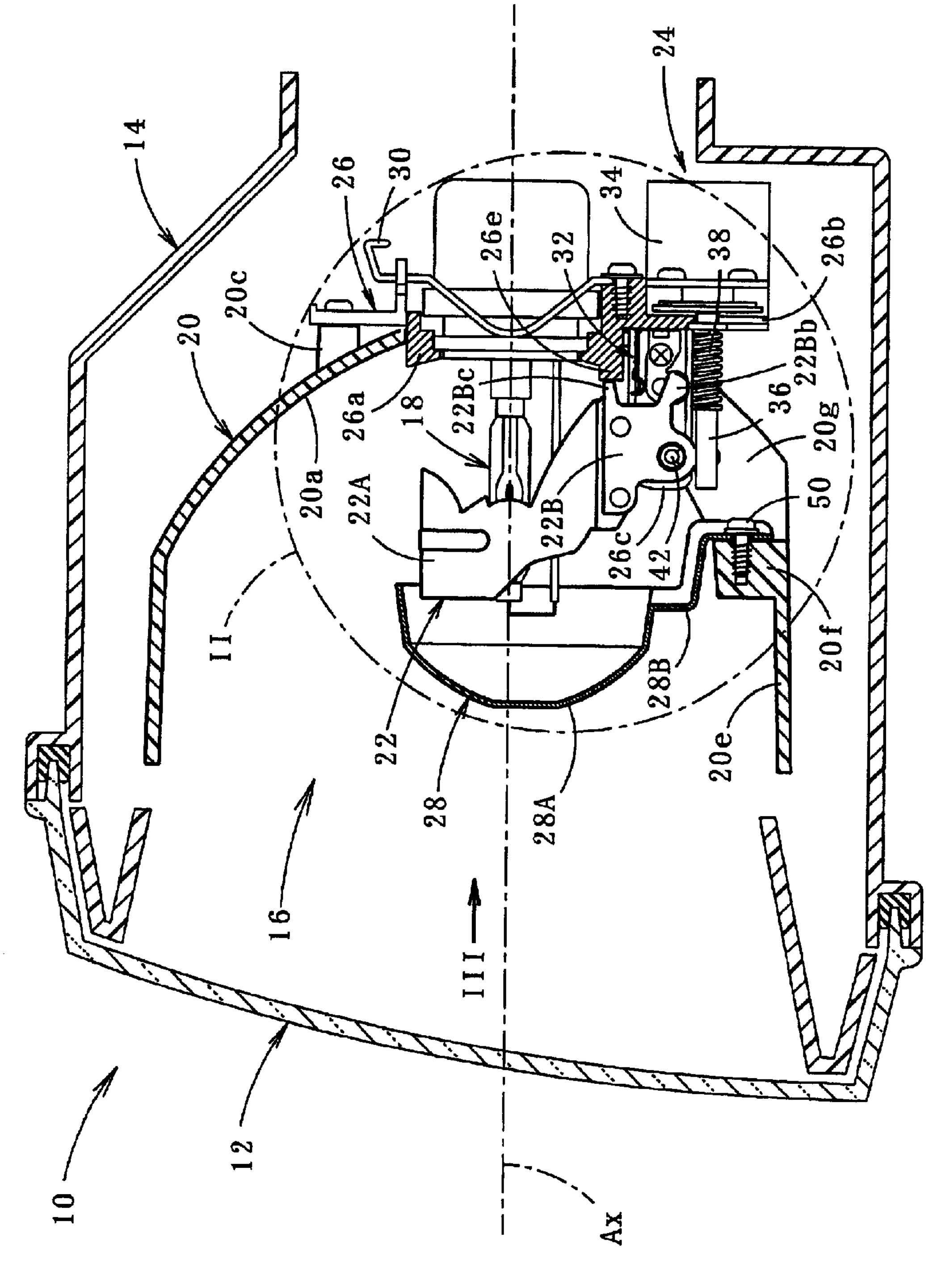
FIG. 1 is a sectional side elevation view of a vehicle headlamp according to an embodiment of the present invention.
Figure 2:
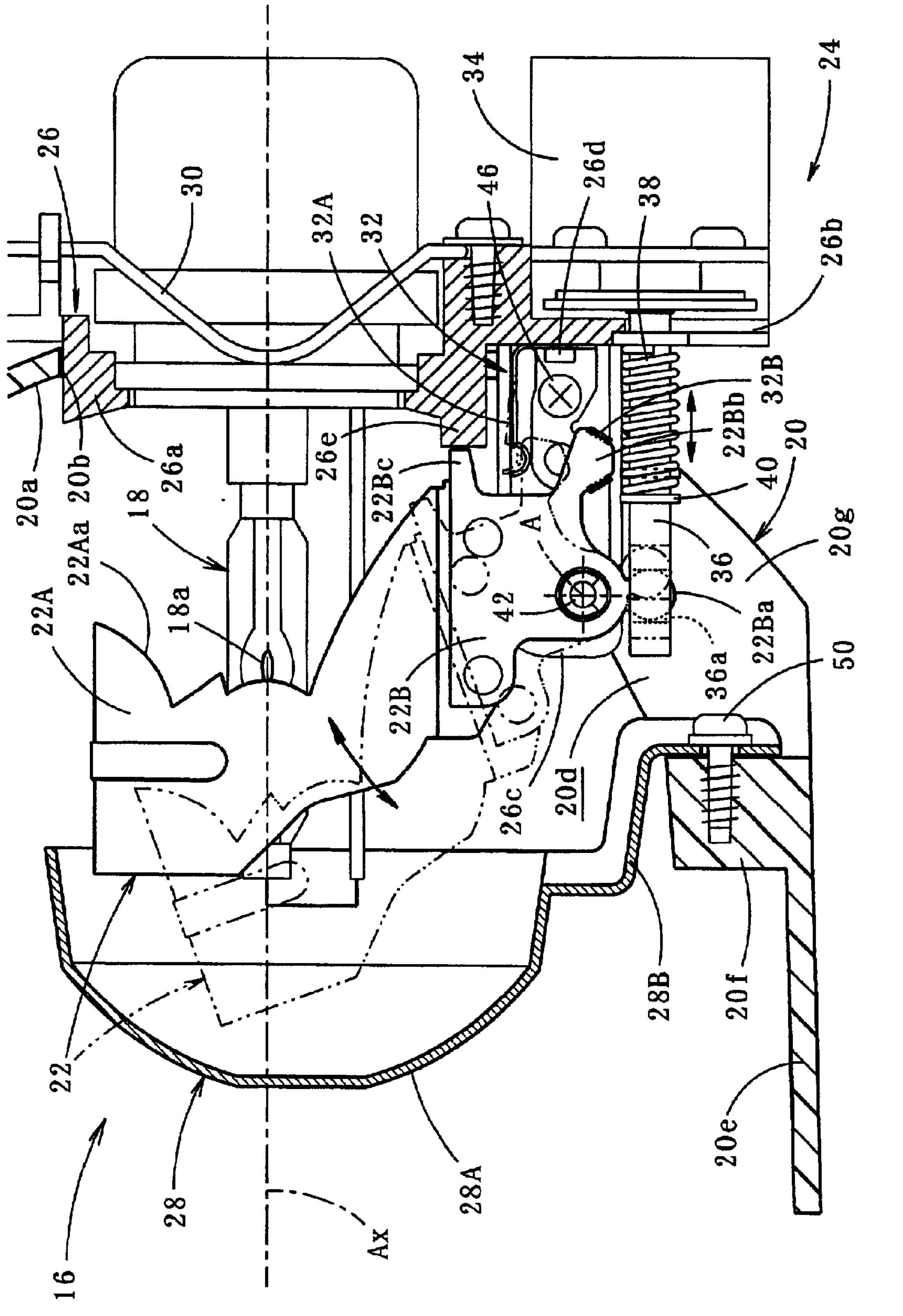
FIG. 2 is an enlarged view of the portion II of FIG. 1.
Figure 3:
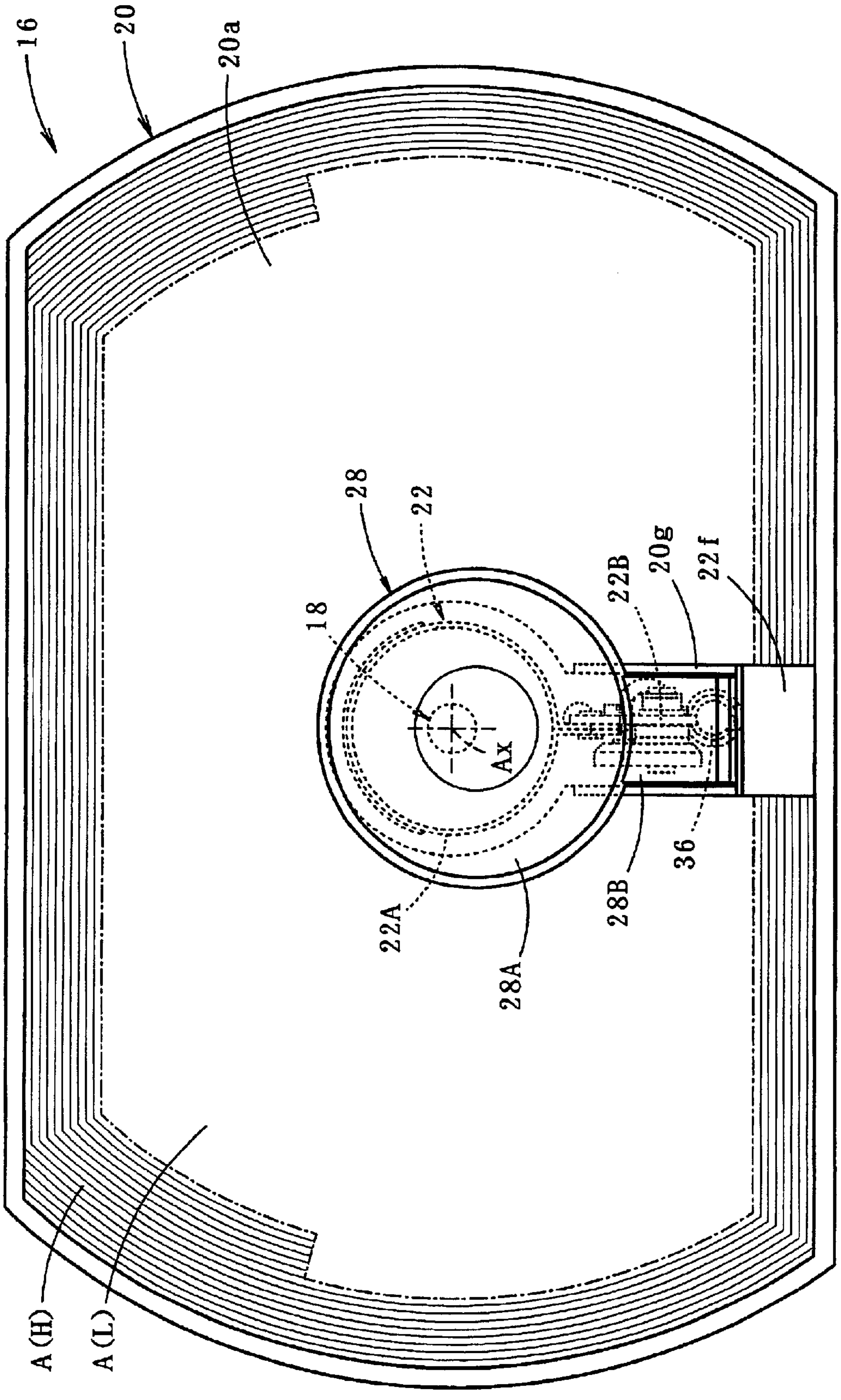
FIG. 3 is a front view of the headlamp of FIG. 2 viewed from the direction of arrow III of FIG. 1.
Figure 4:
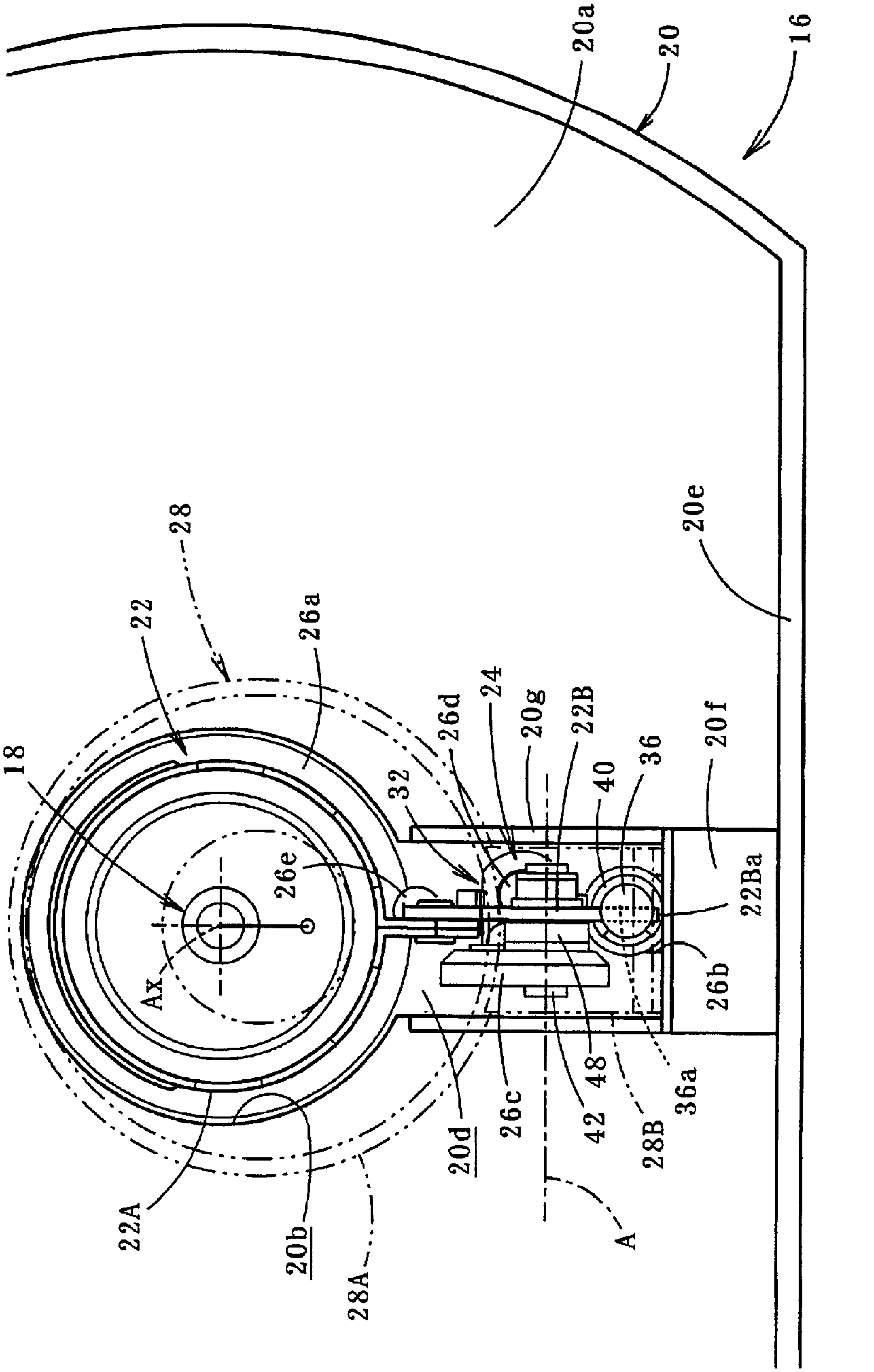
FIG. 4 is an enlarged view of a main part of FIG. 3.
Figure 5:
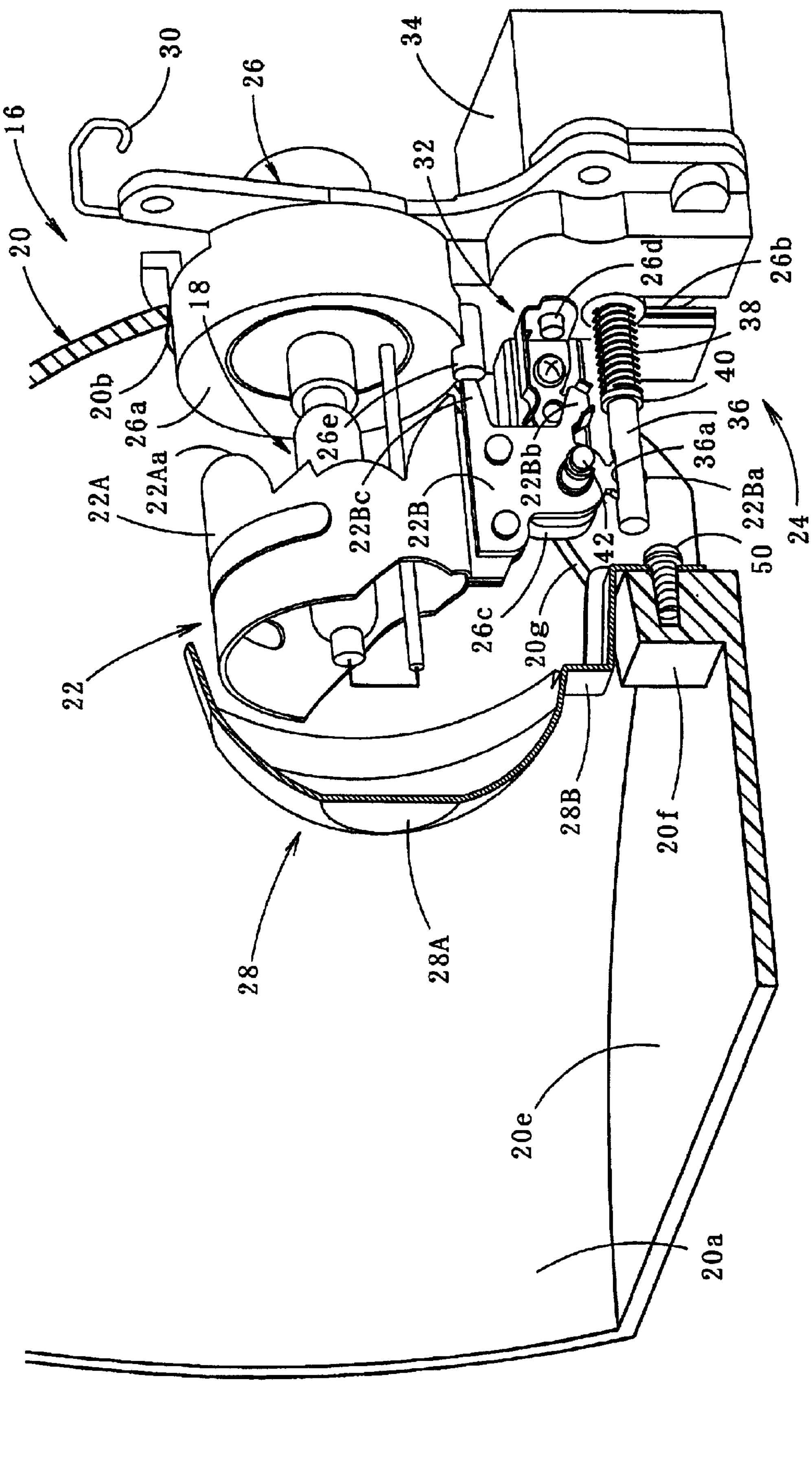
FIG. 5 is a sectional perspective view showing a main part of the vehicle headlamp of FIG. 1.

FIG. 1 is a sectional side elevation of a vehicle headlamp according to an embodiment of the present invention, and FIG. 2 specifically shows the portion II of FIG. 1. FIG. 3 is a diagram as viewed from the direction of arrow III of FIG. 1, and FIG. 4 shows a main part of FIG. 3. FIG. 5 is a sectional perspective view showing a main part of the vehicle headlamp.

As shown in these figures, the vehicle headlamp 10 according to this embodiment has a reflector unit 16 mounted in a lamp chamber defined by a transparent cover 12 and a lamp body 14, and the reflector unit 16 can be tilted in the vertical and lateral directions by an aiming mechanism (not shown).

The reflector unit 16 includes a discharge bulb 18, a reflector 20, a movable shade 22, a shade driver 24, a bulb support base 26 and a fixed shade 28.

The transparent cover 12 is a plane transparent cover and the reflector unit 16 has a function to control light distribution. In other words, the reflector 20 of the reflector unit 16 has a reflecting surface 20*a* for reflecting light from a discharge light-emitting portion 18*a* of the discharge bulb 18 (light source) in a forward direction, so that a beam is emitted forward with a prescribed light distribution pattern by a diffusing or deflecting reflection function of the reflecting surface 20*a*.

The discharge bulb 18 is fixedly supported on the reflector 20 by the bulb support base 26. The bulb support base 26 is a die casting and is inserted through a rear top opening 20*b* of the reflector 20. The bulb support base 26 is fixed with a screw to a plurality of bosses 20*c* formed at the rear surface of the reflector 20. The discharge bulb 18 is fixedly supported on an annular support portion 26*a* of the bulb support base 26 by a wire spring 30 so that the discharge light-emitting portion 18*a* of the discharge bulb 18 is positioned on an optical axis Ax of the reflector 20.

A rectangular opening 20*d* is found under the rear top opening 20*b* in the reflecting surface 20*a* of the reflector 20 and communicates with the rear top opening 20*b*. A shade moving mechanism of the shade driver 24 is housed in the rectangular opening 20*d*. The reflector 20 has a bottom wall 20*e* at the lower end of the reflecting surface 20*a*. The bottom wall 20*e* has a fixed-shade attachment projection 20*f* which projects upward at the front end of the rectangular opening 20*d*. The reflector 20 has a pair of vertical walls 20*g* on both sides of the rectangular opening 20*d* in the reflecting surface 20*a*.

The movable shade 22 includes a tubular (cylindrical) shade body 22A extending in the longitudinal direction and a shade leg 22B extending downward from the lower end of the shade body 22A and in a somewhat backward direction.

A rear edge 22Aa of the shade body 22A has a complex, irregular profile in order to shield light incident on a peripheral region A(H) of the reflecting surface 20*a* of the reflector 20 from the discharge bulb 18 (the discharge light-emitting portion 18*a* thereof). The shade body 22A may be formed by bending a metal plate into a cylindrical shape, and may be riveted to the shade leg 22B at a connecting portion of the lower end.

The movable shade 22 can be switched between a low-beam forming position shown by solid line in FIG. 2 and a high-beam forming position shown by two-dotted chain line in FIG. 2 by the shade driver 24. The movable shade 22 partially shields light incident on the reflecting surface 20*a* from the discharge bulb 18 when positioned at the low-beam position, and does not shield the incident light when positioned at the high-beam position. In particular, when at the low-beam forming position shown in FIG. 3, the movable shade 22 shields the light emitted from the discharge bulb 18 toward the peripheral region A(H) of the reflecting surface 20*a* and allows the light to be incident only on a central region A(L) thereof, so that only the light required to emit a low beam is incident on the reflecting surface 20*a*. On the other hand, when at the high-beam forming position, the movable shade 22 allows the light to be incident on the whole region of the reflecting surface 20*a* so as to ensure the amount of light required to emit a high beam.

Figure 6A:
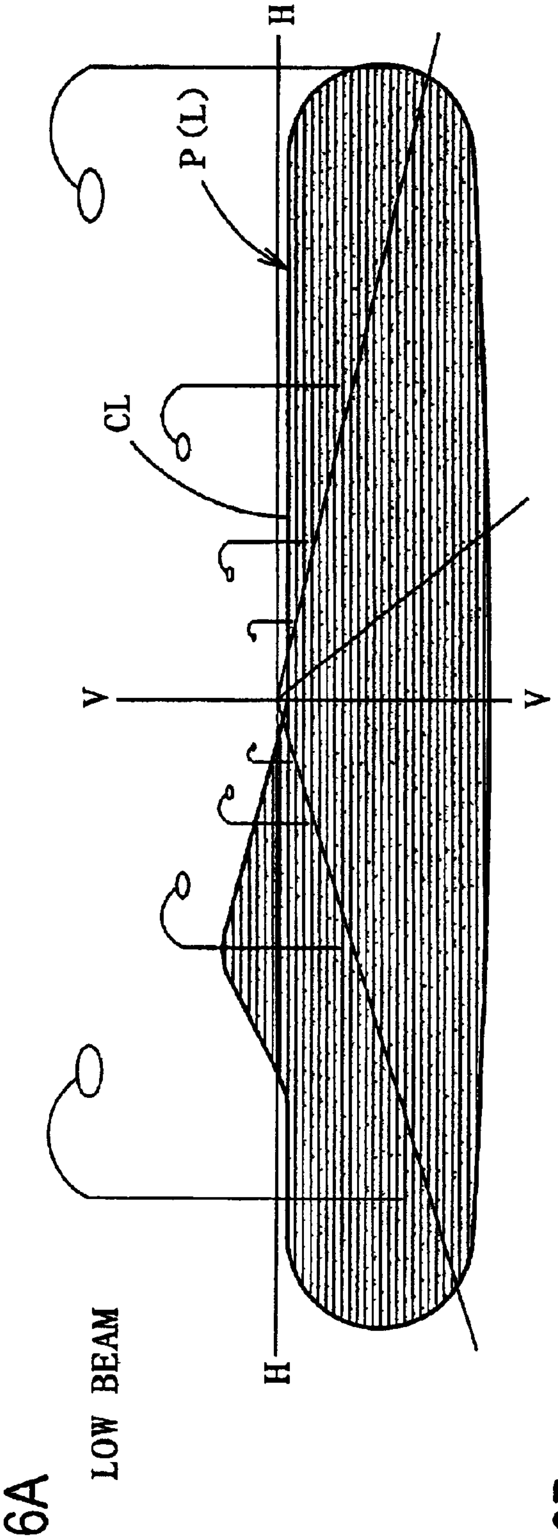
FIGS. 6A and 6B are views of a light distribution pattern that is formed on a virtual vertical screen located 25 meters ahead of a lamp fixture by a low beam and a high beam, respectively, emitted from the vehicle headlamp.
Figure 6B:
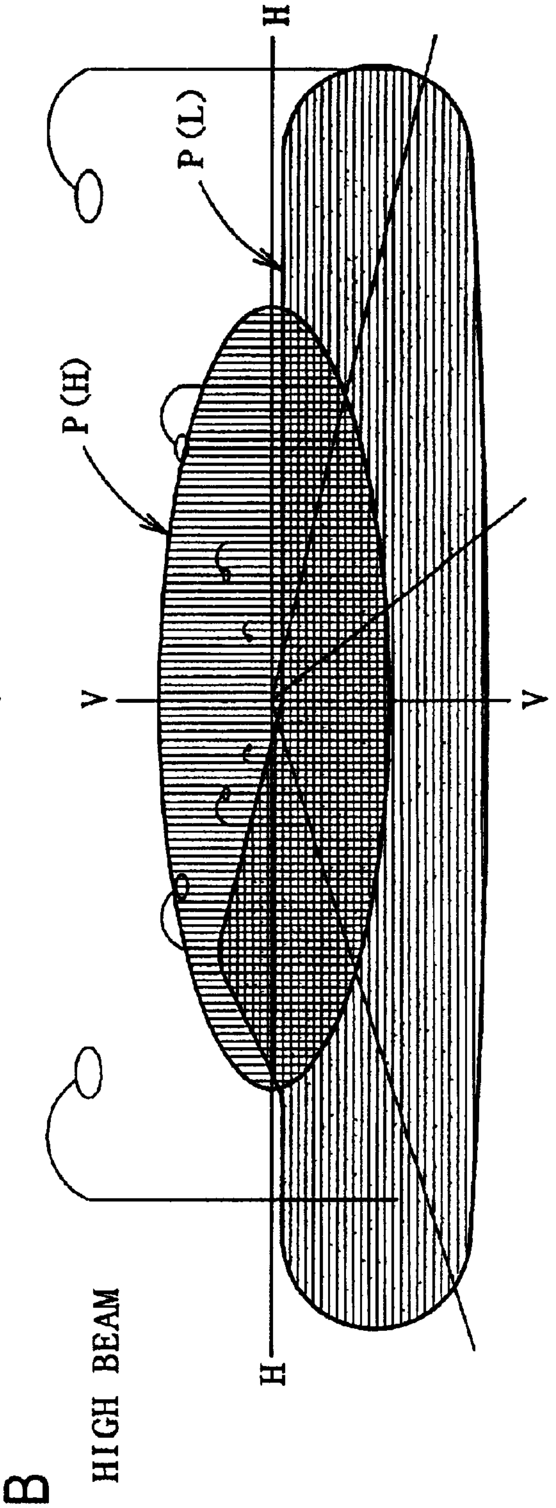

FIGS. 6A and 6B are perspective views of a light distribution pattern that is formed on a virtual vertical screen located 25 meters ahead of the lamp fixture by a low beam and a high beam, respectively, as emitted from the vehicle headlamp 10.

The light distribution pattern shown in FIG. 6A is a low-beam light distribution pattern P(L), and has a cut off line (boundary between bright and dark areas) CL at its upper end. This light distribution pattern is formed by reflected light from the central region A(L) of the reflecting surface 20*a*. The light distribution pattern shown in FIG. 6B is a high-beam light distribution pattern, and is formed as a synthesized light distribution pattern of the low-beam light distribution pattern P(L) and an additional light distribution pattern P(H) that is formed by reflected light from the peripheral region A(H) of the reflecting surface 20*a*.

As shown in FIG. 2, the shade driver 24 includes a solenoid 34 fixed by a screw to the bulb support base 26 at a position under the optical axis Ax of the reflector 20. A return spring 38 is mounted to a plunger (movable iron core) 36 of the solenoid 34, for urging the plunger 36 toward a non-excitation position.

The plunger 36 extends forward through an inverted-U-shaped groove 26*b* formed at the lower end of the bulb support base 26. An E-ring 40 for receiving the elastic urging force of the return spring 38 is mounted to the intermediate portion of the plunger 36 so as to abut on the front end of the return spring 38. A notch 36*a* (which will be described later) is formed in the peripheral surface of the plunger 36 at a position near the tip thereof.

The intermediate portion of the shade leg 22B of the movable shade 22 is supported on a support bracket portion 26*c* by a shaft member 42 so that the movable shade 22 is pivotable about a pivot axis A extending in the lateral direction. The support bracket portion 26*c* protrudes forward from the bulb support base 26. Note that an annular spacer 48 is mounted between the shade leg 22B and the support bracket portion 26*c* in order to minimize the possibility that the connection between the shade leg 22B and the shaft member 42 becomes loose. The movable shade 22 is engaged with the notch 36*a* of the plunger 36 at an engaging portion 22Ba formed at the lower end of the shade leg 22B (this will also be described later).

A displacement regulating member 32 is attached to the support bracket portion 26*c* of the bulb support base 26 at a position near the base end thereof.

The displacement regulating member 32 may be formed by bending a metal plate, and may include an upper elastic piece 32A and a pair of lower elastic pieces 32B. The displacement regulating member 32 is fixed to the side surface of the support bracket portion 26*c* by a screw 46 so as to be engaged with a boss 26*d* formed at the front surface of the bulb support base 26. The upper elastic piece 32A extends forward from the front surface of the bulb support base 26, and the tip thereof has a semi-cylindrical shape with its peak facing downward. A pair of lower elastic members 32B laterally extend from the side surface of the support bracket portion 26*c* so as to form a generally V-shape.

The shade leg 22B of the movable shade 22 has a first projection 22Bb at the lower portion of the rear end face thereof. The first projection 22Bb protrudes rearward between the elastic pieces 32A, 32B of the deformation regulating member 32. The upper end face of the first projection 22Bb tilts downward, and the tip of the lower end face thereof has an inverted trapezoidal shape. When the movable shade 22 is pivoted to the high-beam forming position, the first projection 22Bb abuts the upper elastic piece 32A of the displacement regulating member 32 and elastically deforms the upper elastic piece 32A. When the movable shade 22 is pivoted to the low-beam forming position, the first projection 22Bb abuts the lower elastic pieces 32B of the displacement regulating member 32 and elastically deforms the lower elastic pieces 32B. This reduces the noise generated by the movable shade 22 during beam-switching operation.

The shade leg 22B further has a backward-projecting second projection 22Bc at the upper portion of the rear end face thereof. A forward-projecting stopper pin 26*e* is formed at the lower end of the annular support portion 26*a* on the front surface of the bulb support base 26. The forward projection amount of the stopper pin 26*e* is preset so that the front end face of the stopper pin 26*e* faces the rear end face of the second projection 22Bc of the shade leg 22B with a small gap therebetween when the movable shade 22 is located at the low-beam forming position. The second projection 22Bc and the stopper pin 26*e* abut each other to prevent the movable shade 22 from being excessively pivoted beyond the low-beam forming position.

The fixed shade 28 is mounted ahead of the movable shade 22 so as to cover the movable shade 22. The fixed shade 28 is an integral member of a cap-shaped shade body 28A and a shade leg 28B. The shade leg 28B extends downward from the lower end of the shade body 28A and is offset rearward at the intermediate position so as to have a U-shaped cross section. The lower end of the shade leg 28B of the fixed shade 28 is fixed to the rear surface of the fixed-shade attachment projection 20*f* of the reflector 20 by a screw 50. The shade leg 28B of the fixed shade 28 has approximately the same width as that of the rectangular opening 20*d* of the reflector 20. By inserting the shade leg 28B into the rectangular opening 20*d*, the shade leg 28B is held between the vertical walls 20*g* formed on both sides of the rectangular opening 20*d*.

Figure 7:
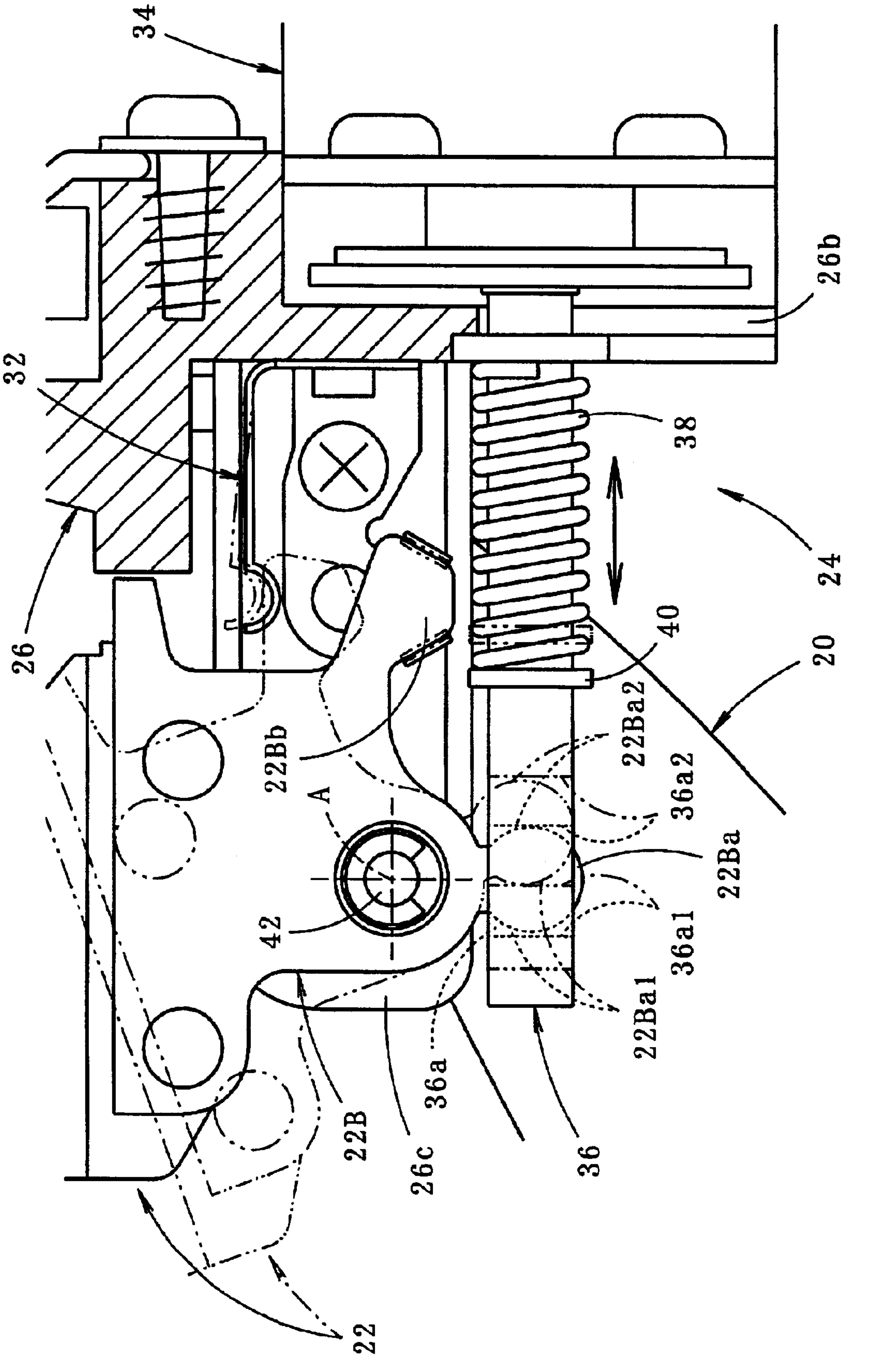
FIG. 7 is an enlarged view of a main part of FIG. 2, illustrating the structure for engagement between a shade leg of a movable shade and a plunger of a solenoid in the vehicle headlamp.
Figure 8:
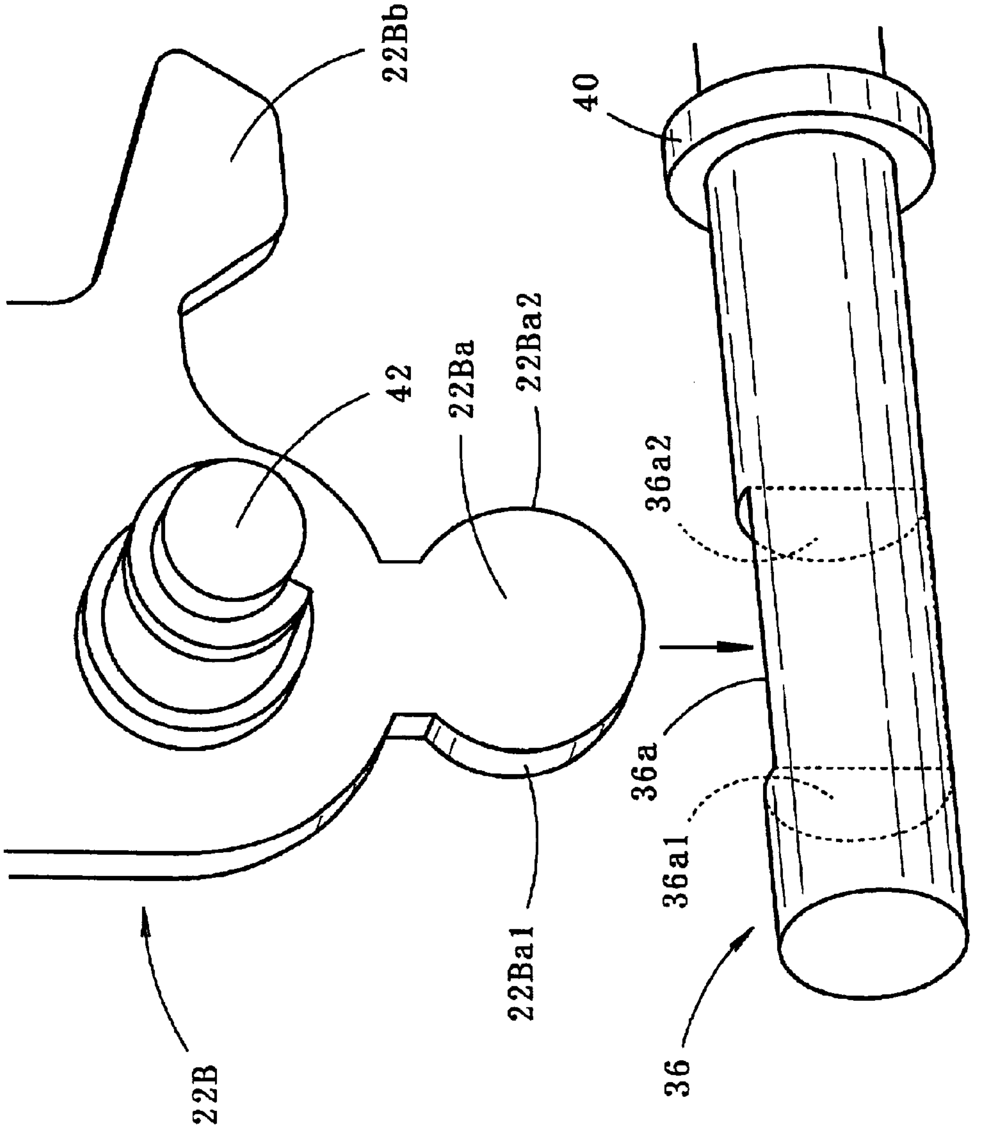
FIG. 8 is an enlarged, exploded perspective view of a main part of FIG. 7.

FIG. 7 is an enlarged view of a main part of FIG. 2, specifically showing the structure for engagement between the shade leg 22B of the movable shade 22 and the plunger 36 of the solenoid 34. FIG. 8 is an exploded perspective view of a main part of FIG. 7.

As shown in FIG. 8, the notch 36*a* of the plunger 36 is a U-shaped recess having a U-shaped cross-section when viewed two-dimensionally. The shade leg 22B is engaged with the plunger 36 by inserting the engaging portion 22Ba of the shade leg 22B into the notch 36*a* (in the dimension of the arrow in FIG. 8). The engaging portion 22Ba may be inserted downward into the notch 36*a* as shown in the figure. Alternatively, the engaging portion 22Ba may be inserted laterally into the notch 36*a*. Since the engaging portion 22Ba abuts on a front end face 36*a*1 and a rear end face 36*a*2 of the notch 36*a*, reciprocating movement of the plunger 36 is converted into pivoting movement of the movable shade 22.

More specifically, when the movable shade 22 is pivoted to the high-beam forming position, the front end face 36*a*1 of the notch 36*a* abuts on a front end face 22Ba1 of the engaging portion 22Ba, as shown by two-dotted chain line of FIG. 7. On the other hand, when the movable shade 22 is pivoted to the low-beam forming position, the rear end face 36*a*2 of the notch 36*a* abuts the rear end face 22Ba2 of the engaging portion 22Ba as shown by the dashed line in FIG. 7.

The front end face 22Ba1 and the rear end face 22Ba2 of the engaging portion 22Ba have an approximately circular-arc shape so as to smoothly abut on the front end face 36*a*1 and the rear end face 36*a*2 of the notch 36*a* as the pivot angle of the movable shade 22 varies. The distance between the front end face 22Ba1 and the rear end face 22Ba2 of the engaging portion 22Ba is slightly smaller than that between the front end face 36*a*1 and the rear end face 36*a*2 of the notch 36*a*.

As specifically described above, in the vehicle headlamp 10 of the present embodiment, the movable shade 22 including the shade body 22A and the shade leg 22B is pivoted between the low-beam forming position and the high-beam forming position by the solenoid 34 having the plunger 36 which extends in the fore-and-aft (forward and rear) direction. The plunger 36 has the notch 36*a* formed in its peripheral surface at a position near the tip thereof, and the shade leg 22B has the engaging portion 22Ba for engaging with the notch 36*a*. Since the engaging portion 22Ba abuts on the front end face 36*a*1 and the rear end face 36*a*2 of the notch 36*a*, reciprocating movement of the plunger 36 is converted into pivoting movement of the movable shade 22. With this structure, the following effects can be obtained:

Unlike conventional headlamps, engagement between the plunger 36 and the shade leg 22B can be obtained without using a spring pin. This eliminates the costs for the spring pin and costs for mounting the same. Moreover, only the notch 36*a* needs to be formed in the plunger 36 instead of forming a slit and a through hole as in the conventional example. This enables a reduction in processing costs.

Accordingly, the present embodiment enables reduction in costs for the structure for engagement between the plunger 36 and the shade leg 22B.

In particular, the notch 36*a* is formed as a U-shaped recess in the present embodiment. This enables the engaging portion 22Ba of the shade leg 22B to reliably abut on the front end face 36*a*1 and the rear end face 36*a*2 of the notch 36*a*. Moreover, the engaging portion 22Ba may either be inserted downward or laterally into the notch 36*a*. This allows the lamp fixture to be mounted with improved flexibility.

Moreover, in the present embodiment, the front end face 22Ba1 and the rear end face 22Ba2 of the engaging portion 22Ba have an approximately circular-arc shape. This enables reciprocating movement of the plunger 36 to be smoothly converted into pivoting movement of the movable shade 22.

Figure 9:
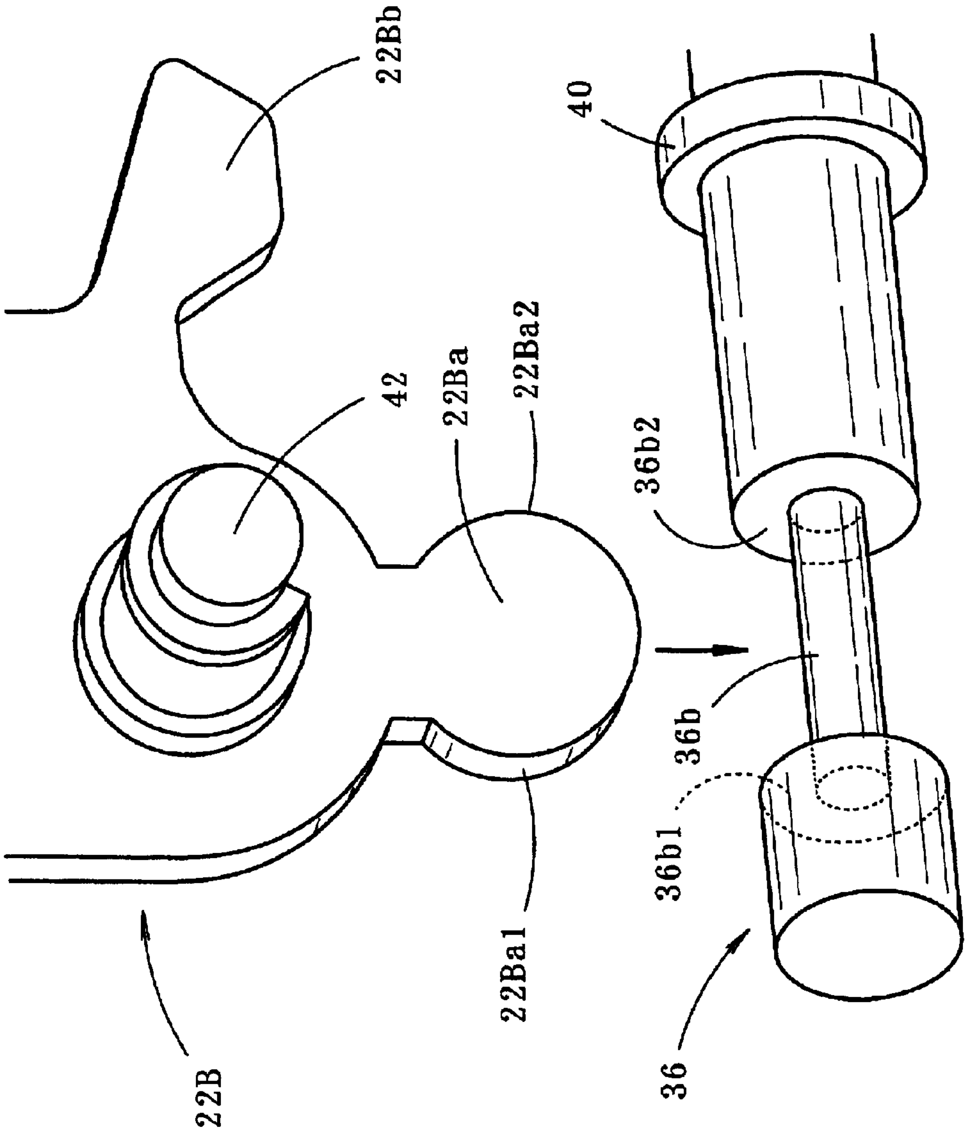
FIG. 9 is a diagram similar to FIG. 8, showing a modification of the engagement structure according to the invention.

The notch 36*a* of the plunger 36 is a U-shaped recess in the above embodiment. However, a notch 36*b* as shown in FIG. 9 may alternatively be used. The notch 36*b* is an annular recess having a U-shaped cross-section and formed in the entire peripheral surface of the plunger 36.

This structure enables the engaging portion 22Ba of the shade leg 22B to reliably abut on the front end face 36*a*1 and the rear end face 36*b*2 of the notch 36*b* regardless of the angular position of the plunger 36 with respect to its axis. As a result, mounting operation can be conducted with improved efficiency. Moreover, forming the notch 36*b* as such an annular recess enables the notch 36*b* to be easily formed by a turning process, thereby achieving reduction in processing costs.

Moreover, this structure enables the engaging portion 22Ba to be inserted into the notch 36*b* from any direction, whereby the lamp fixture can be mounted with further improved flexibility.

Figure 10:
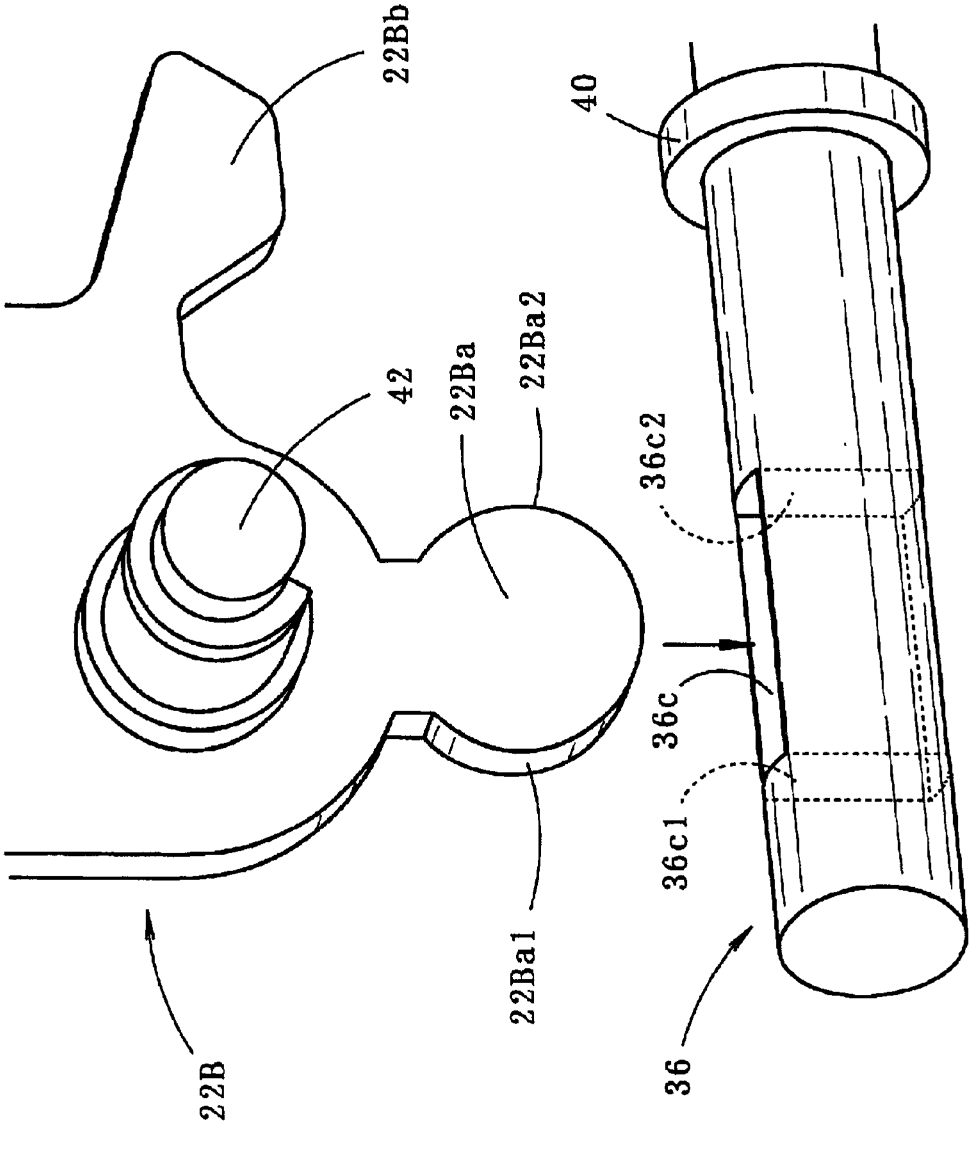
FIG. 10 is a diagram similar to FIG. 8, showing another modification of the engagement structure according to the invention.

Alternatively, a notch 36*c* as shown in FIG. 10 may be used. The notch 36*c* is formed as a rectangular slot extending through the plunger 36 and having a rectangular cross-section, and the engaging portion 22Ba of the shade leg 22B abuts on a front end face 36*c*1 and a rear end face 36*c*2 thereof.

This structure prevents the engaging portion 22Ba of the shade leg 22B from being disengaged from the notch 36*c* of the plunger 36 even when the plunger 36 and the movable shade 22 become excessively loose, or the like. As a result, engagement between the plunger 36 and the shade leg 22B can be reliably maintained.

The structure for engagement between the plunger 36 and the shade leg 22B in the vehicle headlamp 10 having a so-called paraboloidal reflector unit 16 is described in the above embodiment. However, the same engagement structure as that of the above embodiment can be employed in a vehicle headlamp having a projector-type lamp fixture unit 50 as shown in FIG. 11.

Figure 11:
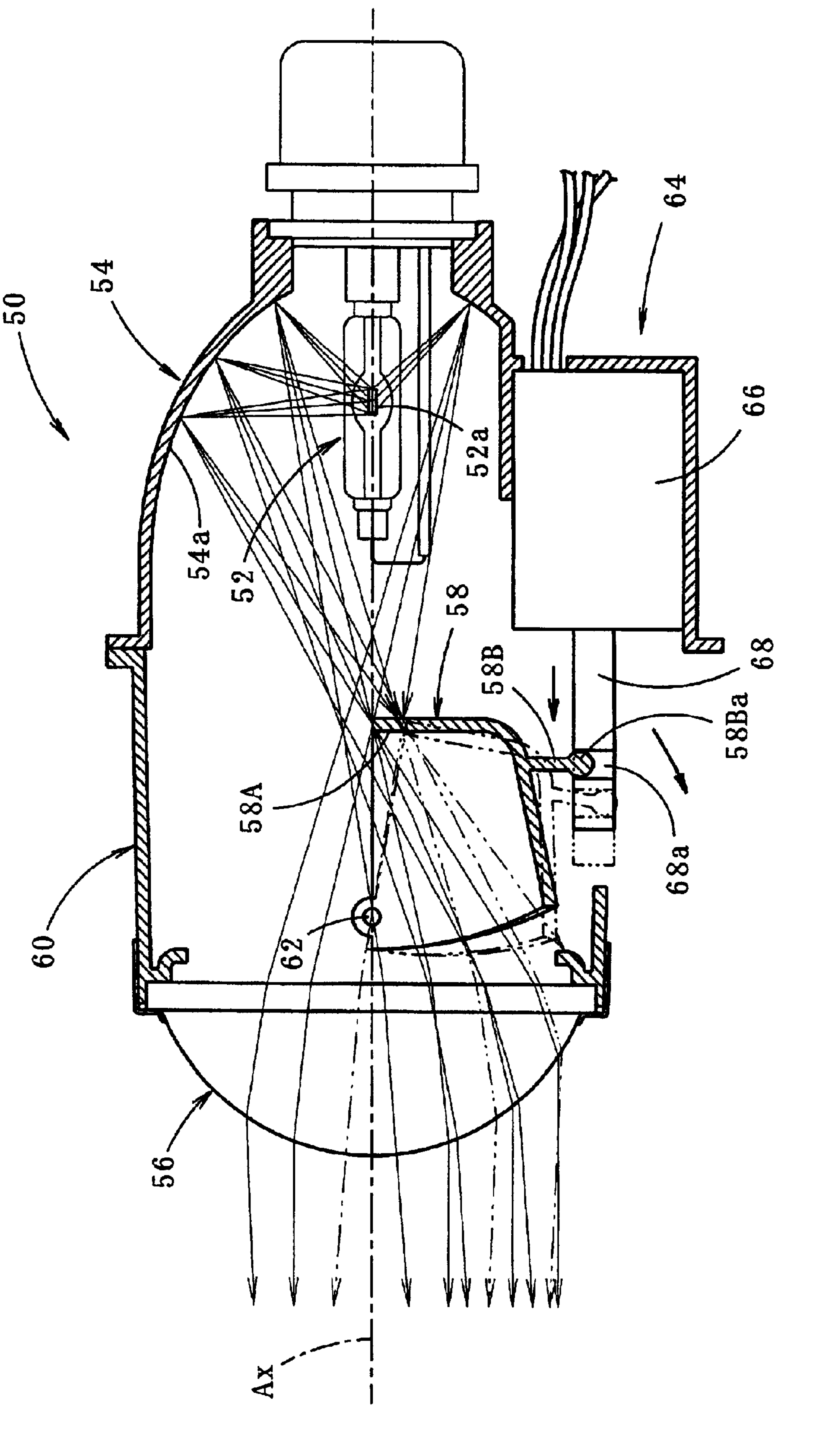
FIG. 11 is a diagram similar to that of FIG. 2, showing a modification of the above embodiment.

More specifically, in this lamp fixture unit 50, a discharge light-emitting portion 52*a* of a discharge bulb 52 (light source) is positioned on the optical axis Ax extending in the longitudinal direction of the vehicle, as shown in FIG. 11. Light from the discharge light-emitting portion 52*a* is reflected forward by a reflector 54 toward the optical axis Ax. The reflector 54 has a reflecting surface 54*a* with a deformed elliptical-spherical shape. The reflected light then passes through a projection lens 56 mounted ahead of the reflector 54, whereby a beam is emitted forward with a prescribed light distribution pattern.

This lamp fixture unit 50 partially shields the reflected light from the reflector 54 by using a movable shade 58 mounted between the reflector 54 and the projection lens 56. A holder 60 is mounted between the reflector 54 and the projection lens 56, and the movable shade 58 is supported on the holder 60 so as to be pivotable in the longitudinal direction by a pair of right and left pins 62. The movable shade 58 can be switched between a low-beam forming position (shown by solid line in FIG. 11) and a high-beam forming position (shown by chain double-dashed line in FIG. 11). In the low-beam forming position, the movable shade 58 partially shields the reflected light from the reflector 54 to form a low-beam light distribution pattern. In the high-beam forming position, the movable shade 58 does not shield the reflected light and forms a high-beam distribution pattern.

The movable shade 58 is pivoted by a shade driver 64. The shade driver 64 includes a solenoid 66 fixed to the bottom of the reflector 54. The solenoid 66 urges a plunger 68 toward a non-excitation position (shown by solid line in the figure) by a built-in return spring. A notch 68*a* is formed in the peripheral surface of the plunger 68 at a position near the tip thereof. The notch 68*a* is a U-shaped recess having a U-shaped cross section when viewed two-dimensionally.

The movable shade 58 is formed from a shade body 58A and a shade leg 58B extending downward from the shade body 58A. The movable shade 58 is engaged with the tip of the plunger 68 at a circular-arc-shaped engaging portion 58Ba formed at the tip of the shade leg 58B. This engagement is realized by inserting the engaging portion 58Ba of the shade leg 58B into the notch 68*a* of the plunger 68. Since the engaging portion 58Ba abuts on the front end face and rear end face of the notch 68*a*, reciprocating movement of the plunger 68 is converted into pivoting movement of the movable shade 58.

The above engagement structure enables reduction in costs for the structure for engagement between the plunger 68 and the shade leg 58B as in the above embodiment even in the projector-type lamp fixture unit 50.

Note that, in this case as well, the notch 68*a* of the plunger 68 may be an annular recess or a rectangular slot instead of the U-shaped recess.

Figure 12:
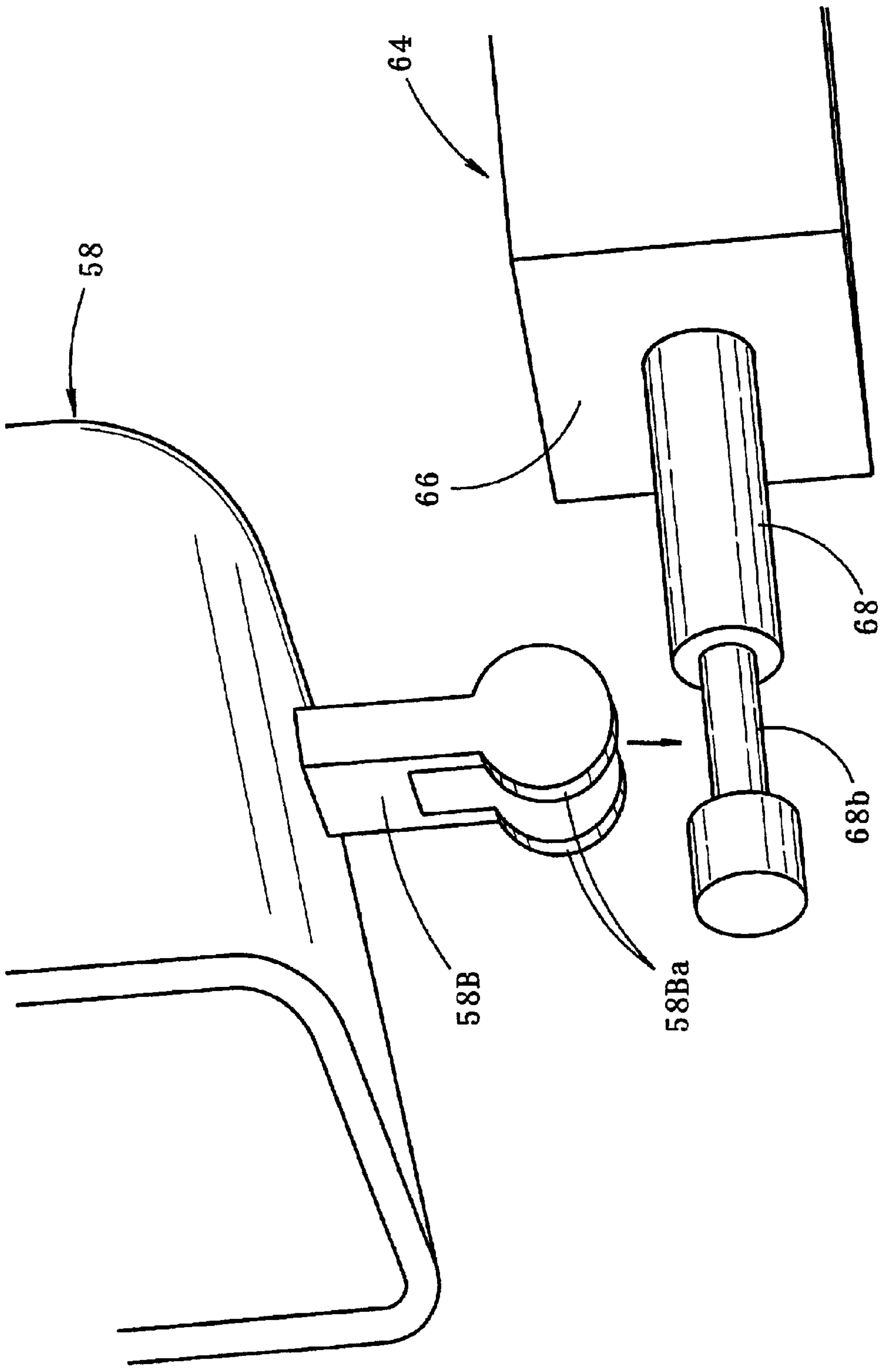
FIG. 12 is an exploded perspective view of a main part of FIG. 11, showing a modification of the structure for engagement between a shade leg of a movable shade and a plunger of a solenoid.
Figure 13:
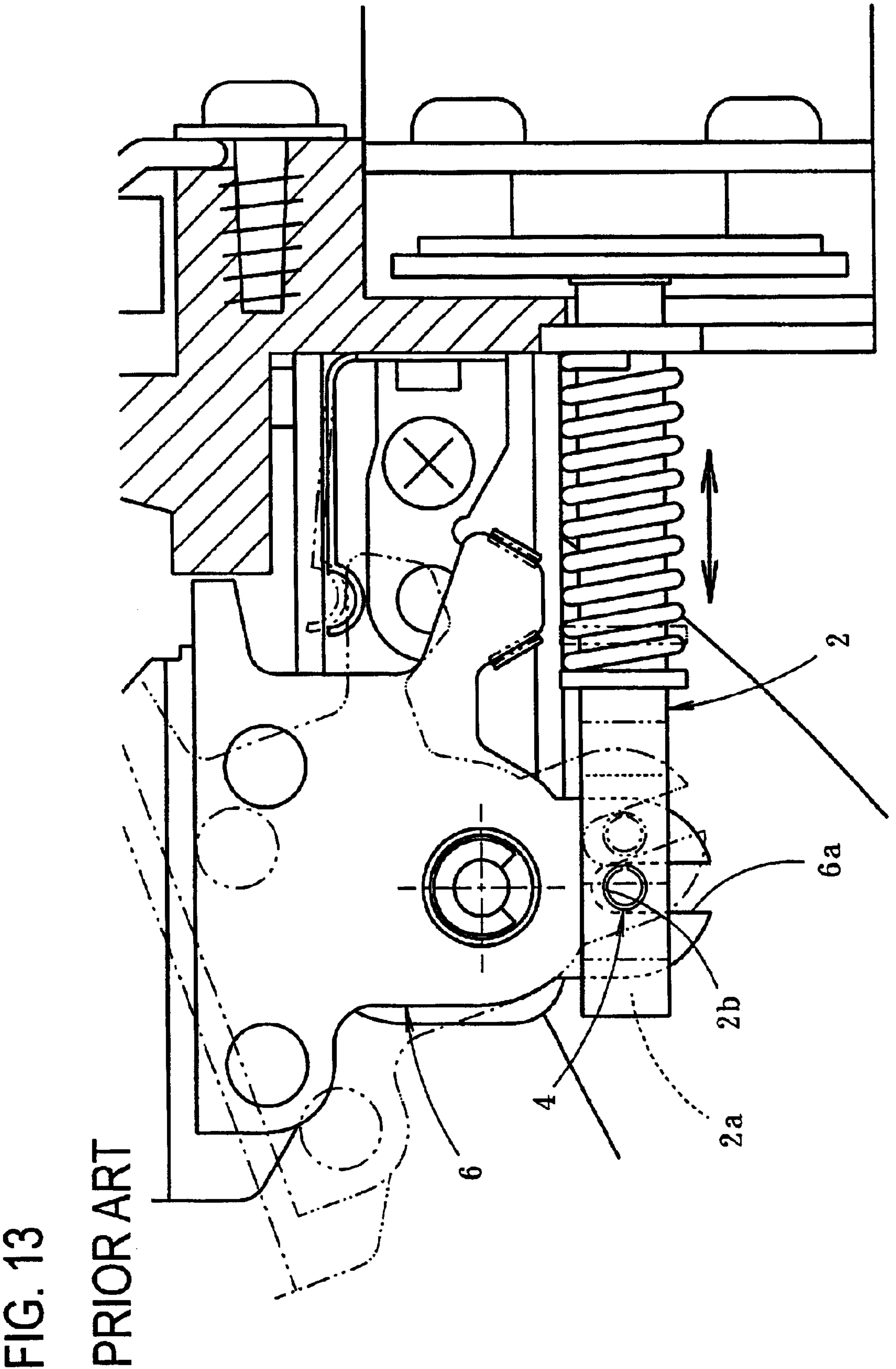
FIG. 13 PRIOR ART
FIG. 13 illustrates a conventional example of a headlamp.

Alternatively, as shown in FIG. 12, the shade leg 58B may have a pair of engaging portions 58Ba formed with a prescribed gap therebetween, so that the pair of engaging portions 58Ba engage with a notch 68*b* by holding therebetween the plunger 68 at a position near the tip thereof.

This structure prevents the engaging portion 58Ba of the shade leg 58B from being disengaged from the notch 68*b* of the plunger 68 even when the plunger 68 and the movable shade 58 become excessively loose, or the like. As a result, engagement between the plunger 68 and the shade leg 58B can be reliably maintained.

In particular, the notch 68*b* of FIG. 12 is formed as an annular recess. This enables the above engagement to be maintained while achieving reduction in processing costs and improvement in mounting operation efficiency.

The notch 68*b* may alternatively be a U-shaped recess or a rectangular slot instead of the annular recess. In this case as well, engagement between the plunger 68 and the shade leg 58B can be reliably maintained by holding a portion of the plunger 68 located near the tip thereof between the pair of engaging portions 58Ba.

What is claimed is:

1. A vehicle headlamp comprising:

a light source;

a reflector for reflecting light forward from the light source;

a movable shade capable of shielding part of light incident on the reflector from the light source or part of light reflected from the reflector; and a shade driver for moving the movable shade between two prescribed positions having different light-shielding amounts for the incident light or the reflected light, wherein the movable shade includes a shade body and a shade leg extending from the shade body, the shade driver includes a solenoid having a plunger extending in a longitudinal direction, the plunger has a prescribed notch formed in a peripheral surface at a position near a tip thereof, and the shade leg has an engaging portion for engaging with the notch, wherein a front end face and a rear end face of the engaging portion have an approximately circular-arc shape, and as the engaging portion abuts on a front end face and a rear end face of the notch, reciprocating movement of the plunger is converted into movement of the movable shade.

2. The vehicle headlamp according to claim 1, wherein the movement of the movable shade is realized as a pivoting movement in a longitudinal direction.

3. The vehicle headlamp according to claim 1 wherein the notch is a U-shaped recess having a U-shaped cross-section.

4. The vehicle headlamp according to claim 1 wherein the notch is an annular recess formed in a whole peripheral surface of the plunger and having a U-shaped cross-section.

5. The vehicle headlamp according to claim 1 wherein the notch is a rectangular slot extending through the plunger and having a rectangular cross section.

6. The vehicle headlamp according to claim 1 wherein the shade leg has a pair of engaging portions formed with a prescribed gap therebetween.

7. The vehicle headlamp according to claim 6, wherein the pair of engaging portions engage with the notch by contacting the plunger between the engaging portions at a position near the tip thereof.

8. A vehicle headlamp comprising:

a light source;

a reflector for reflecting light forward from the light source;

a movable shade including a shade body and a shade leg extending from the shade body, the shade leg having an engaging portion, wherein a front end face and a rear end face of the engaging portion have an approximately circular-arc shape; and a shade driver including a solenoid having a plunger extending in a longitudinal direction for moving the movable shade between at least two prescribed positions having different light-shielding amounts, wherein the plunger has a notch formed in a peripheral surface at a position near a tip thereof, and wherein the shade leg engaging portion abuts on a front end face and a rear end face of the notch such that reciprocating movement of the plunger is converted into movement of the movable shade to shield part of the light from the light source or from the reflector.

9. The vehicle headlamp according to claim 8 wherein the movement of the movable shade is realized as a pivoting movement in a longitudinal direction.

10. The vehicle headlamp according to claim 8 wherein the notch is a U-shaped recess having a U-shaped cross-section.

11. The vehicle headlamp according to claim 8 wherein the notch is an annular recess formed in a whole peripheral surface of the plunger and having a U-shaped cross-section.

12. The vehicle headlamp according to claim 8 wherein the notch is a rectangular slot extending through the plunger and having a rectangular cross section.

13. The vehicle headlamp according to claim 8 wherein the shade leg has a pair of engaging portions formed with a prescribed gap therebetween.

14. The vehicle headlamp according to claim 13, wherein the pair of engaging portions engage with the notch by contacting the plunger between the engaging portions at a position near the tip thereof.

* * * * *